UNITED STATES PATENT OFFICE.

RUSSELL W. BERRIDGE, OF DETROIT, MICHIGAN.

PROCESS FOR THE MANUFACTURE OF GRAPE AND OTHER FRUIT JUICES.

1,393,422.  Specification of Letters Patent.  Patented Oct. 11, 1921.

No Drawing.  Application filed March 27, 1919. Serial No. 285,555.

*To all whom it may concern:*

Be it known that I, RUSSELL W. BERRIDGE, a citizen of the United States, residing at Detroit, in the county of Wayne and State of Michigan, have invented certain new and useful Improvements in Processes for the Manufacture of Grape and other Fruit Juices; and I do hereby declare the following to be a full, clear, and exact description of the invention, such as will enable others skilled in the art to which it appertains to make and use the same.

This invention relates to an improved method of preparing grape and other fruit juices by using osmotic force or action to extract the juices through the cell walls and outer skin of the fruit, instead of using mechanical force as has been practised heretofore.

To carry my invention into effect, I take any convenient glass, earthenware, or acid proof enamelware container capable of being sealed air tight, preferably one of two gallon capacity, and place therein two quarts of carefully selected fruit. To this is added one pound of pure granulated sugar, the same being sufficiently shaken to distribute the sugar through the fruit. Sufficient water to fill the container is now heated to the boiling point and boiled for about five minutes, then cooled to about 210° F., at which temperature I add it to the fruit and sugar in the container, the same being sealed immediately in any well known way, and set aside in a cool place for a time, varying from not less than ninety days to not more than one year, depending upon the variety and ripeness of the fruit used, and the color, strength, and aroma of the product desired.
During this time the osmotic action takes place. The hot dilute sugar solution on one side of the semi-permeable fruit skin and cell walls, and the concentrated fruit juice within the skin and cell walls, under the effect of heat causes the immediate opening of the pores of the skin, and renders said skin much more permeable (the unheated skin being almost impermeable). An ideal condition for osmotic action is thus brought about. Consequently, under the action of endosmosis, the sugar solution passes into the fruit and, under the action of exosmosis the fruit juices are forced out until a condition of equilibrium is established. At the end of this operation, when diffusion has been effected, the container is opened and the contents thereof (which must be unfermented) strained through a silkolene cloth, or other suitable material. The filtrate thus obtained is again placed in the container which has been thoroughly cleaned and sterilized with boiling water or steam, sealed and placed in a water bath at a temperature of 160° F. for one hour. The sterilized liquid thus obtained is immediately bottled and sealed, and the bottles and their contents are subjected to a temperature of 160° F. for one hour on each of three successive days, so as to fully insure a product sterile of microbe life, and unimpaired natural color, aroma and flavor.

Having thus described my invention, what I claim as new and useful, and desire to secure by Letters Patent is:

1. The process of preparing grape and other fruit juices, which consists in placing the fruit in a container, mingling a relatively large quantity of hot, dilute sugar solution therewith for opening the pores and making permeable the skins and cell walls and aiding osmosis, then sealing the container, cooling and subjecting the contents to osmotic action until diffusion or extracting of juice has been effected, then filtering and sterilizing the resulting juices.

2. The process of preparing grape and other friut juices, which consists in placing the fruit in a container, adding a small proportion of sugar and a relatively large quantity of water at a temperature of approximately 210° F. for making permeable the skins and cell walls and forming a dilute sugar solution to aid osmosis, then sealing the container and subjecting the contents to osmotic action in a cool place till diffusion or extraction of the juice has been effected, then filtering and sterilizing the resulting juice and sealing in a container.

3. The process of preparing grape and other fruit juices, which consists in commingling in a container fruit, sugar and hot water in about the proportion of two quarts of fruit, one pound of sugar and enough water to approximately 210° F. to fill a two gallon container, thereby forming a dilute hot sugar solution to make the skins and cell walls permeable and promote osmosis, then sealing the container, cooling and subjecting the contents to osmotic action until diffusion or extraction of the juice has been effected, then filtering and sterilizing the resulting juice, sealing in a container and again sterilizing at a temperature of about 160° F.

In testimony whereof I affix my signature.

RUSSELL W. BERRIDGE.

Witnesses:
CLAYTON A. POWELL,
HENRY C. RUMMEL.